US008866617B2

(12) United States Patent
Kurosawa et al.

(10) Patent No.: US 8,866,617 B2
(45) Date of Patent: Oct. 21, 2014

(54) PLASTIC CAP WITH IC TAG AND METHOD OF ATTACHING IC TAG TO THE CAP

(71) Applicants: Toyo Seikan Kaisha, Ltd., Tokyo (JP); Japan Crown Cork Co., Ltd., Tokyo (JP)

(72) Inventors: Takahiro Kurosawa, Kanagawa (JP); Takayuki Kikuchi, Kanagawa (JP); Kazuo Tanabe, Kanagawa (JP); Katsumi Hashimoto, Kanagawa (JP)

(73) Assignees: Toyo Seikan Kaisha, Ltd., Tokyo (JP); Japan Crown Cork Co., Ltd., Tokyo (JP)

( * ) Notice: Subject to any disclaimer, the term of this patent is extended or adjusted under 35 U.S.C. 154(b) by 33 days.

(21) Appl. No.: 13/835,837

(22) Filed: Mar. 15, 2013

(65) Prior Publication Data

US 2013/0199017 A1 Aug. 8, 2013

Related U.S. Application Data

(62) Division of application No. 12/530,757, filed as application No. PCT/JP2008/054887 on Mar. 17, 2008, now Pat. No. 8,421,632.

(30) Foreign Application Priority Data

Mar. 22, 2007 (JP) ................................ 2007-074113
Nov. 6, 2007 (JP) ................................ 2007-288816

(51) Int. Cl.
G08B 13/14 (2006.01)

(52) U.S. Cl.
USPC ............... 340/572.8; 340/572.9; 340/572.1; 340/10.1

(58) Field of Classification Search
USPC ............ 340/572.8, 572.9, 572.1, 572.4, 10.1, 340/10.3, 10.42, 10.52; 343/767, 795; 215/228, 316; 29/427, 428
See application file for complete search history.

(56) References Cited

U.S. PATENT DOCUMENTS 7,126,479 B2 10/2006 Claessens et al.
7,705,734 B2 4/2010 Martinelli
(Continued)

FOREIGN PATENT DOCUMENTS

CN 2285248 7/1998
JP 36-000877 1/1961
(Continued)

OTHER PUBLICATIONS

China Office action, dated Dec. 6, 2010 along with an english translation thereof.

*Primary Examiner* — Hung T. Nguyen
(74) *Attorney, Agent, or Firm* — Greenblum & Bernstein, P.L.C.

(57) ABSTRACT

A plastic cap with IC tag storing product information provided on the upper surface of a top plate. The top plate is formed by an annular flange and a recessed portion 37, the recessed portion, including a side wall continuous to the inner circumferential edge of the annular flange and a bottom continuous to the lower end of the side wall. The tag 10 is attached to the annular flange to cover the recessed portion. A gap between the tag and the bottom is maintained to such a degree that the transmission and reception of signals to and from the tag are not interrupted when the back surface of the bottom comes in contact with water.

10 Claims, 12 Drawing Sheets

(56) References Cited

U.S. PATENT DOCUMENTS

| | | | |
|---|---|---|---|
| 7,876,221 B2 * | 1/2011 | Tanaka et al. | 340/572.8 |
| 8,120,484 B2 | 2/2012 | Chisholm | |
| 2006/0021084 A1 | 1/2006 | Abraham et al. | |
| 2006/0049948 A1 * | 3/2006 | Chen et al. | 340/572.7 |
| 2007/0139205 A1 | 6/2007 | Tanaka et al. | |
| 2007/0296599 A1 * | 12/2007 | Wang et al. | 340/572.8 |
| 2009/0212954 A1 * | 8/2009 | Adstedt et al. | 340/572.8 |
| 2010/0000960 A1 | 1/2010 | Anderson | |

FOREIGN PATENT DOCUMENTS

| | | |
|---|---|---|
| JP | 2005-321935 | 11/2005 |
| JP | 2006-062716 | 3/2006 |
| JP | 2008-021084 | 1/2008 |
| WO | 2007/063863 | 6/2007 |

* cited by examiner (a)

(b)

PLASTIC CAP WITH IC TAG AND METHOD OF ATTACHING IC TAG TO THE CAP

CROSS REFERENCE TO RELATED APPLICATIONS

The present application is a divisional of U.S. application Ser. No. 12/530,757 which is a National Stage of International Application No. PCT/JP2008/054887, filed Mar. 17, 2008, which claims priority to Japanese Application No. 2007-074113 filed Mar. 22, 2007 and Japanese Application No. 2007-288816 filed Nov. 6, 2007. The disclosures of application Ser. Nos. 12/530,757 and PCT/JP2008/054887 are expressly incorporated by reference herein in their entireties.

TECHNICAL FIELD

This invention relates to a plastic cap having an IC tag storing product information attached to a top plate thereof, and to a method of attaching the IC tag to the plastic cap.

BACKGROUND ART

Bar codes representing product information such as the date of production, names of the manufacturer and distributor, usable term, etc. have heretofore been widely utilized for a variety of kinds of products. Here, the bar codes are such that the encoded information is read out by using a reader. Therefore, a surface on where the bar code is printed must be made flat arousing, however, a problem in that limitation is imposed on the surface where the bar code is printed and on the amount of information that can be encoded especially in the field of packing materials such as bottles and caps.

In recent years, therefore, a technology for displaying information has been utilized by making use of an IC tag. The IC tag is also called an RFID (radio-frequency identification) and is a communication terminal of a very small size of the form of a tag in which an IC chip storing predetermined information is buried together with an r-f antenna in a dielectric material such as a resin or a glass. The IC tag reads the product information stored in the IC chip through radio communication. A memory in the IC chip is capable of storing the data of, for example, several hundreds of bytes, offering an advantage of capability for storing large amounts of product information. Besides, the IC tag can read the stored information in a non-contacting manner without accompanied by such problems as wear due to contact and, further, offers such an advantage in that the IC tag can be worked in a shape to meet the form of the product and in a small size and in a reduced thickness.

As caps provided with the IC tag, patent documents 1 and 2 are proposing those having an IC tag buried in a top plate.
  Patent document 1: JP-A-2006-62716
  Patent document 2: JP-A-2005-321935

DISCLOSURE OF THE INVENTION

Problems that the Invention is to Solve

The IC tags can be grouped into those of the type which effect the communication relying on the electromagnetic induction and those of the type which effect the communication relying on the electromagnetic waves. The IC tag of the type of electromagnetic induction has an advantage in that the communication is little affected by water accompanied, however, by a defect in that it occupies a large area. The IC tag of the type of electromagnetic waves, on the other hand, has a defect in that the communication is subject to be affected by water but has such an advantage that it occupies a small area. At present, therefore, the IC tag of the type of electromagnetic waves has been studied in the field of caps.

When the above-mentioned cap having the electromagnetic wave type IC tag provided in the top plate was applied to a container filled with a content containing water such as a beverage, however, there remained such a problem that transmission and reception of information became difficult.

There was no particular problem when, for example, the IC tag was attached to an upper lid of a cap of the two-piece type comprising a cap body fitted to the mouth portion of the container and an upper lid fitted to the cap body. When the IC tag was attached to the upper surface of a top plate of a cap of the one-piece type which comprises the top plate and a skirt wall hanging down from the circumferential edge portion of the top plate and which is directly fitted to the mouth portion of the container, however, there remained a problem in that water contained in a beverage caused dielectric loss or mismatching of impedance resulting in the interruption of transmission and reception of information to and from the IC tag.

Further, the IC tag can be attached to the cap by, for example, burying the IC tag in the top plate of the cap by insert-molding or by heat-melt-adhering (heat-sealing) the IC tag to the top plate of the cap. In either method, however, the IC tag to be attached to the cap is very light in weight (usually, about 0.02 g) and is of the shape of a small piece, which is very difficult to handle. Therefore, it is difficult to fix the IC tag to a predetermined position in the metal mold at the time of insert-molding or to fix the IC tag to a predetermined position of the top plate at the time of heat-sealing. Namely, the position tends to be easily deviated and, besides, the IC tag tends to fly off in a step of conveying the IC tag to a step of fixing the IC tag to the predetermined position, causing the productivity to become very low.

It is, therefore, an object of the present invention to provide a plastic cap with an IC tag, which enables product information to be reliably input to the IC tag and the product information that is input to be reliably output without interrupting transmission and reception of information to and from the IC tag.

Another object of the present invention is to provide a method of attaching an IC tag to a cap, which is capable of effectively avoiding deviation in position or flying-off of the IC tag that stores product information, and of efficiently attaching and fixing the IC tag to the cap.

Means for Solving the Problems

According to the present invention, there is provided a one-piece plastic cap to be fitted to a mouth of a container which contains a water-containing content, and having a top plate and a skirt wall hanging down from a circumferential edge portion of the top plate and, further, having an IC tag storing product information attached to an upper surface of said top plate, wherein:
  said top plate forms a shielding member that maintains a gap between the water-containing content in the container and said IC tag to such a degree that the transmission and reception of signals to and from the IC tag are not interrupted by the water-containing content.

In the plastic cap of the present invention, it is desired that:
(1) The top plate is formed by an annular flange and a recessed portion continuous to the inner circumferential edge of the annular flange; the recessed portion includes a side wall continuous to the inner circumferential edge of the annular flange, and a bottom continuous to the lower end of the side wall and the bottom is working as the shielding member; and the IC tag is attached to the annular flange to cover the recessed portion, and wherein a gap between the IC tag and the bottom of the recessed portion is maintained to such a degree that the transmission and reception of signals to and from the IC tag are not interrupted when the back surface of the bottom comes in contact with the water-containing content;

(2) The IC tag is attached by heat-melt-adhering the circumferential edge portion thereof onto the upper surface of the top plate;

(3) A protuberance extending upward is formed on the upper surface of the bottom of the recessed portion; and (4) The side wall of the recessed portion of the top plate includes an upper large-diameter portion having a relatively large outer diameter and a lower small-diameter portion having a relatively small outer diameter, an inner ring is formed on the outer circumferential surface of the upper large-diameter portion of the side wall so as to extend downward being separated away from the outer circumferential surface of the lower small-diameter portion, and the mouth portion of the container is inserted in space between the skirt wall and the inner ring so as to be fixed therein.

According to the present invention, further, there is provided a method of attaching an IC tag to a plastic cap, comprising steps of:

preparing an IC tag web in which a plurality of IC units of a combination of IC chips and metal antennas are arranged and fixed on one surface of a first thermoplastic resin substrate sheet, a second thermoplastic resin substrate sheet, and a plastic cap having a top plate and a skirt wall hanging down from a circumferential edge portion of the top plate;

preparing a laminated sheet in which said IC tag web is laminated on a surface of the second thermoplastic resin substrate sheet by heat-adhering the first thermoplastic resin substrate sheet of said IC tag web and the second thermoplastic resin substrate sheet together in a manner that said IC units are positioned on an outer surface side;

punching said laminated sheet in a disk shape successively for each of the IC units fixed thereto to thereby successively form tag pieces of the disk shape having the second thermoplastic resin substrate adhered to the IC tag in which one IC unit is fixed to the first thermoplastic resin substrate, and successively fitting and false-fixing the punched tag pieces onto the upper surfaces of the top plates of the caps in a manner that the second thermoplastic resin substrate is on the outer surface side simultaneously with the punching; and fixing said IC tag onto the top plate of the cap via the second thermoplastic resin substrate in an integral form by heat-melt-adhering the second thermoplastic resin substrate onto the upper surface of the top plate of the cap.

In the method of attaching the IC tag of the present invention, the following embodiments are preferred: i.e., (1) The first thermoplastic resin substrate sheet comprises polyethylene terephthalate and the second thermoplastic resin substrate sheet comprises polyolefin;

(2) A stepped surface is formed in an annular shape at the outer circumferential edge portion on the upper surface of the top plate of the cap, the inner region of the stepped surface forms a surface lower than the outer region, and a tag piece punched from the laminated sheet is fitted onto the inner region of the stepped surface;

(3) The tag piece punched from the laminated sheet is inserted into an inner portion of the stepped surface in a manner that the outer circumferential end surface of the second thermoplastic resin substrate is closely adhered to the stepped surface, and is, thus, fitted onto, or is fitted and false-fixed onto the upper surface of the top plate of the cap;

(4) An undercut is formed in an upper end portion of the stepped surface so as to protrude inward, and the tag piece is false-fixed by the engagement of the undercut with an outer circumferential edge portion of the second thermoplastic resin substrate;

(5) The inner region of the stepped surface on the upper surface of the top plate of the cap includes an annular flange continuous to the lower end of the stepped surface and is extending inward, and a recessed portion continuous to the inner circumferential edge of the annular flange, and the tag piece is so fitted that the circumferential edge portion thereof faces the annular flange;

(6) The first thermoplastic resin substrate sheet and the second thermoplastic resin substrate sheet are heat-adhered together in a manner that at least the IC chip is not pressed on the surface of the first thermoplastic resin substrate sheet;

(7) The IC tag web is laminated while intermittently feeding the second thermoplastic resin substrate sheet, the laminated sheet is punched after having been laminated, and the punched tag pieces are fitted onto the top plates of the caps;

(8) The second thermoplastic resin substrates possessed by the IC tag pieces are spot-heat-adhered onto the upper surfaces of the top plates of the caps so that the tag pieces are false-fixed while intermittently feeding the caps having the tag pieces fitted onto the upper surfaces of the top plates thereof; and (9) The caps to which the tag pieces are false-fixed are introduced into the step of continuous feeding, and the second thermoplastic resin substrates possessed by the tag pieces are heat-melt-adhered onto the upper surfaces of the top plates of the caps while continuously feeding the caps so that the IC tags are fixed to the top plates of the caps integrally therewith.

Effects of the Invention

In the plastic cap of the present invention, the shielding member maintains a predetermined gap between the IC tag attached to the annular flange of the top plate and the water-containing content (e.g., various kinds of beverages like water, juice, etc.) contained in the container. This prevents such an inconvenience that the transmission and reception are interrupted due to dielectric loss or mismatching of impedance caused by the water-containing content . It is, therefore, made possible to reliably transmit (input) the product information to the IC tag and to receive (output) the product information that is input.

The above shielding member can also be attached to the inner surface of the top plate. According to the present invention, however, it is desired to form a recessed portion in the top plate itself so that the bottom of the recessed portion works as the shielding member. By so forming the recessed portion that the bottom thereof works as the shielding member, the cap can be easily molded.

In the present invention, further, upon forming a protuberance on the upper surface of the bottom of recessed portion of top plate of the cap, in case an external force is accidentally exerted from the upper direction, the IC tag is supported by the protuberance and can, therefore, be effectively avoided from being deformed or damaged. To discard the used cap, further, the bottom of the recessed portion is pushed upwards from the back surface thereof, whereby the IC tag is easily removed from the top plate of the cap offering an advantage from the standpoint of disposal in a classified manner.

In the invention, further, the side wall of recessed portion of the top plate can be directly and closely adhered to the inner surface of the mouth portion of the container to maintain sealing performance. Desirably, however, an inner ring is provided as a member independent from the side wall of the recessed portion, and the mouth portion of the container is inserted into between the inner ring and the skirt wall so that the inner ring is closely adhered to the inner surface of the mouth portion of the container to maintain sealing performance. That is, to maintain sealing performance by the side wall of the recessed portion, the mouth portion of the container must be inserted in space between the side wall and the skirt wall. Here, however, since the lower end of the side wall is integral with the bottom, the side wall lacks flexibility. As a result, it may become difficult to insert the mouth portion of the container in space between the side wall and the skirt wall. Besides, adhesion becomes unstable between the side wall and the mouth portion of the container, and sealing performance may decrease. Upon providing the inner ring as a member independent from the side wall of the recessed portion, on the other hand, flexibility can be maintained to a sufficient degree, which is favorable for avoiding the above-mentioned inconvenience.

The inner ring can be provided at a position, for example, between the skirt wall on the inner surface of annular flange of the top plate and the side wall of the recessed portion so as to serve as a member independent from the side wall of the recessed portion. According to the invention particularly desirably, further, the inner ring is formed at an intermediate portion of the side wall of the recessed portion. Concretely, it is desired that the side wall of the recessed portion is so formed as to include an upper large-diameter portion located at an upper position and having a relatively large outer diameter and a lower small-diameter portion located at a lower position and having a relatively small outer diameter, and the inner ring is so formed as to extend downward from the outer circumferential surface of the upper large-diameter portion of the side wall being separated away from the outer circumferential surface of the lower small-diameter portion. With the inner ring being provided as described above, space of a suitable size is maintained between the IC tag and the water-containing content even in case the solution in the container infiltrates into space between the inner ring and the side wall of the recessed portion, effectively preventing the transmission of signals to the IC tag from being interrupted by the water-containing content.

The above IC tags have been placed in the market, usually, in the form of an IC tag web in which a multiplicity of IC units comprising an IC chip and a metal antenna are fixed to the first thermoplastic resin substrate (usually, polyethylene terephthalate) sheet with an adhesive or the like. The attaching method of the invention makes use of the IC tag web, fixes the second thermoplastic resin (usually, polyolefine such as polypropylene) substrate sheet for heat-sealing onto the IC tag web to prepare a laminated sheet, successively punches the multiplicity of IC units fixed onto the laminated sheet, fits the punched IC tag pieces onto the top plates of the caps successively simultaneously with the punching, and fixes them by heat-melt-adhesion. According to this method, the IC tags which are light in weight and are of the shape of small pieces are not treated by themselves but are treated in the form of the web or the laminated sheet in the process until they are fitted onto the top plates of the caps, avoiding such an inconvenience that the IC tags may fly off.

When the tag piece (IC tag) is fitted onto the top plate of the cap, too, the tag piece is readily false-fixed and is, thereafter, heat-melt-adhered to the top plate of the cap, effectively avoiding such an inconvenience that the IC tag is removed from the top plate of the cap or is deviated in position before the IC tag is heat-melt-adhered to the top plate of the cap integrally together.

As described above, the present invention makes it easy to handle the IC tags which are light in weight and are in the form of small pieces, and to effectively attach the IC tags to the top plates of the caps without causing the IC tags to fly off or to be deviated in position.

BEST MODE FOR CARRYING OUT THE INVENTION

<Structure of the IC Tag>

Figure 1:
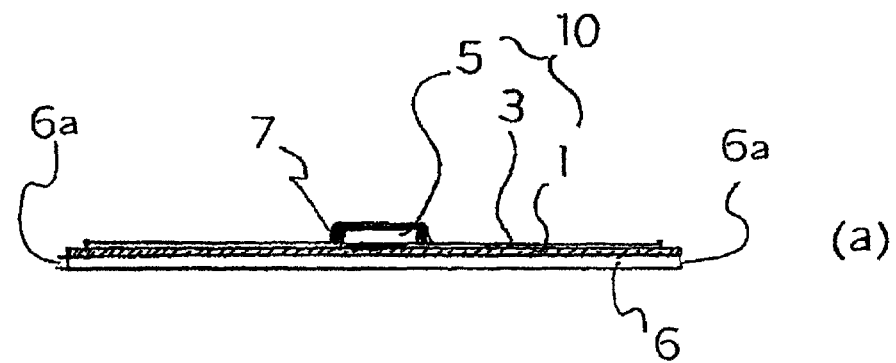
[FIG. 1] include a side sectional view (a) and a plan view (b) showing the structure of an IC tag to be attached to a cap according to the invention.
Figure 1:
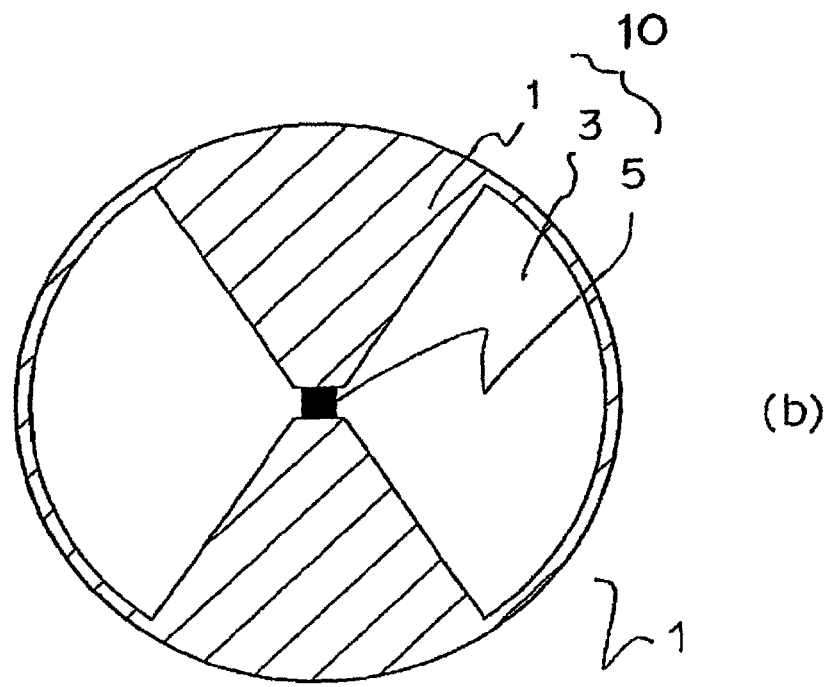

Referring to FIG. 1 (a) and FIG. 1 (b), an IC tag (generally designated at 10) has a structure in which a metallic antenna 3 and an IC chip 5 are fixed onto an upper surface of a disk-shaped film 1 comprising a first thermoplastic resin. Here, in order to attach the above IC tag 10 to a cap, a film comprising a second thermoplastic resin is heat-adhered onto the back surface of the first thermoplastic resin film 1.

The first thermoplastic resin has a suitable degree of heat resistance, resistance against chemicals and strength to avoid deterioration at the time of being heated for forming the metallic antenna 3 of a predetermined shape thereon, at the time of etching or at the time of being pressed and heated for fixing the IC chip 5. Generally, the first thermoplastic resin is a polyester resin such as polyethylene terephthalate (PET). The film 1 comprising the above first thermoplastic resin has a thickness of, usually, about 7 to about 100 μm.

The metallic antenna 3, usually, comprises a thin film (having a thickness of about 5 to about 50 82 m) of a low-resistance metal, such as aluminum, copper, silver or gold, has a predetermined pattern, and is used for transmitting and receiving signals. The metallic antenna 3 is formed, usually, by sticking a metal foil onto the surface of the first thermoplastic resin film 1 by heat-adhesion or, as required, by adhesion by using a suitable adhesive, and in a predetermined shape by etching. As the adhesive to be used as required, there is, usually, used an acid-modified olefin resin obtained by graft-modifying a polyolefin resin with an unsaturated carboxylic acid or a derivative thereof (e.g., acid anhydride), or a thermosetting adhesive resin of the type of, for example, urethane, isocyanate or epoxy.

The IC chip 5 is provided by, for example, flip-chip mounting so as to be electrically conductive to the antenna 3, and stores information related to a cap to which the IC tag 10 is attached or related to a content and the like of a container to which the cap is attached. Namely, predetermined information is stored by transmitting signals through the antenna 3, or information stored in the IC tag 10 is read out through the antenna 3.

As shown in FIG. 1(a), further, the IC chip 5 is, usually, sealed and protected by using a sealing agent 7 such as polyimide or bismaleimide resin.

The second thermoplastic resin film 6 is used for firmly adhering and fixing the IC tag 10 to the top plate of the cap that will be described later by heat-melt-adhesion. As the second thermoplastic resin, therefore, there is used a resin material that can be favorably heat-adhered to the polyolefin such as polypropylene or polyethylene forming the cap or, concretely, there can be used the same resin as the cap resin material, such as polypropylene or polyethylene.

In the step of attaching the IC tag to the cap that will be described later, the second thermoplastic resin film 6 and the first thermoplastic resin film 1 are punched in a state of being laminated one upon the other. Therefore, the end surfaces of these films are forming a continuous flat surface, and the IC tag 10 can be fixed by heat-melt-adhering an outer circumferential end surface 6a of the second thermoplastic resin film 6 onto the top plate of the cap.

The second thermoplastic resin film 6 may have a thickness enough for being heat-adhered by heat-melt-adhesion and, usually, may have a thickness of about 300 to about 1000 μm. In particular, since the heat-melt-adhesion is accomplished at the outer circumferential end surface 6a, it is desired that the thickness is better relatively large within the above range.

When the film 1 comprising the first thermoplastic resin such as PET is directly heat-melt-adhered to the top plate of the cap without suing the above second thermoplastic resin film 6, the heat-adhesiveness is so poor between the first thermoplastic resin and the cap material that the IC tag 10 cannot be firmly fixed to the top plate of the cap, permitting the IC tag to be easily removed. Therefore, the IC tag 10 cannot often be effectively utilized.

<Structure of the Cap>

Figure 2:
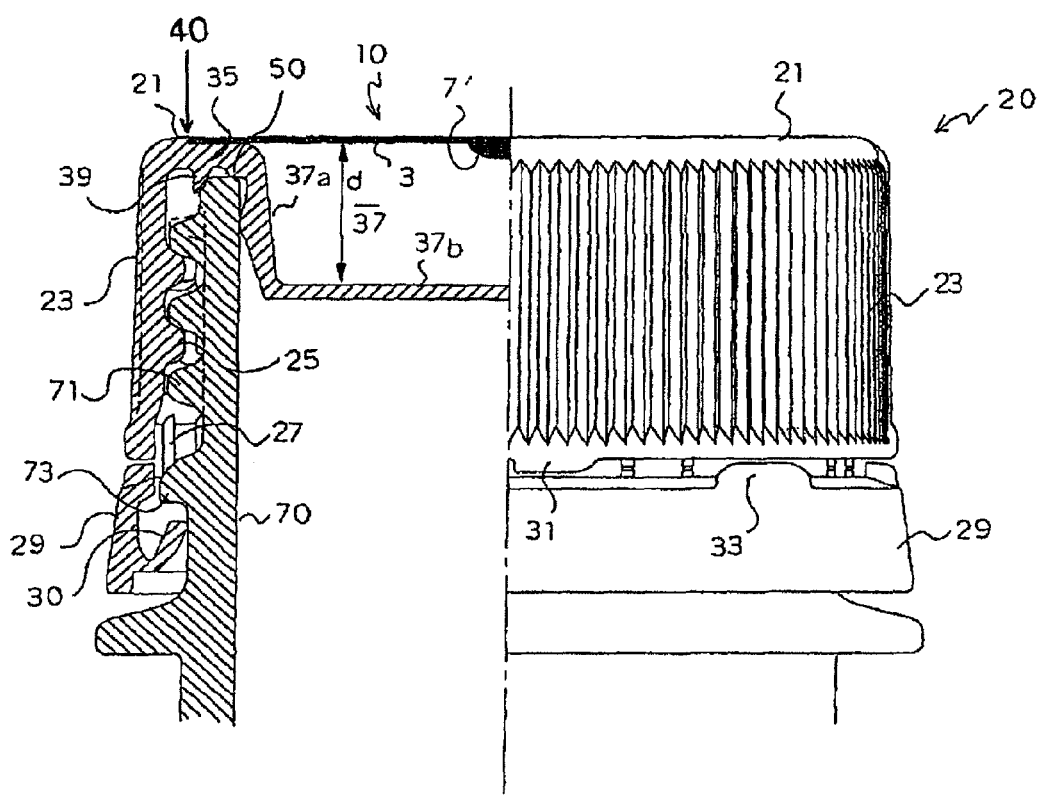
[FIG. 2] is a half-sectional side view showing an example of the cap in which a recessed portion having a bottom working as a shielding member is formed in a top plate and the IC tag of FIG. 1 is attached to the top plate, together with a mouth portion of a container.

Referring to FIG. 2 showing the cap to which the IC tag 10 is attached, the cap generally designated at 20 is, usually, made from a polyolefin such as polyethylene or polypropylene, and includes a top plate 21 and a skirt wall 23 hanging down from the circumferential edge portion of the top plate 21.

A screw 25 is formed in the inner surface of the skirt wall 23 to engage with a screw 71 formed on the outer surface of a mouth portion 70 of a container to which the cap 20 is to be fitted. A tamper-evidence (TE) band 29 is provided at a lower end of the skirt wall 23 via a breakable bridge 27, and upwardly oriented flap pieces 30 are formed on the inner surface of the TE band 29 discretely along the circumference thereof.

That is, the cap 20 is fitted to the mouth portion 70 of the container with its screw 25 being screw-engaged therewith. Upon turning in the direction of opening, the cap 20 fitted to the mouth portion 70 of the container is removed from the mouth portion 70 of the container. At the time of opening, the flap pieces 30 formed on the inner surface of the TE band 29 come into engagement with a flange portion 73 formed on the outer surface of the mouth portion 70 of the container limiting the TE band 29 from being lifted up. The bridge 27, therefore, breaks and the TE band 29 is separated away from the skirt wall 23. From the fact that the TE band 29 has been cut away, a general customer can recognize that the cap 20 was once removed from the mouth portion 70 of the container.

In the example of FIG. 2, first stopper pieces 31 are formed on the lower end surface of the skirt wall 23 maintaining a suitable gap, while second stopper pieces 33 are formed on the upper end surface of the TE band 29 maintaining a suitable gap so as to be positioned among the first stopper pieces 31.

That is, the first stopper piece 31 has a side surface upright in the direction of closing. In fitting the cap 20 to the mouth portion 70 of the container, the upright side surface of the first stopper piece 31 comes in contact with the upright surface of the second stopper piece 33 formed on the upper surface of the TE band 29, whereby the skirt wall 23 and the TE band turn integrally together in the direction of closing, effectively avoiding the breakage of the bridge 27 at the time of closing.

The upper end surface of the second stopper piece 33 is a flat surface. At the time of closing, this surface comes in contact with the lower end surface of the skirt wall 23, and a predetermined gap is maintained between the upper end surface of the TE band 29 and the lower end surface of the skirt wall 23, effectively preventing the breakage of the bridge 27 at the time of closing.

The invention, however, is not limited to the cap forming the above stopper pieces 31, 33 only, but can be applied to the caps without forming such stoppers, too, as a matter of course.

The top plate 21, on the other hand, includes an annular flange 35 and a recessed portion 37 continuous to the inner circumferential edge of the annular flange 35.

On the inside of the outer circumferential edge portion on the upper surface of the top plate 21, there are formed an annular flange 35 and a recessed portion 37 continuous to the inner circumferential edge of the annular flange 35. An upright stepped surface 40 is annularly formed at a boundary portion between the outer circumferential edge portion and the annular flange 35.

The recessed portion 37 is formed by a side wall 37a continuous to the inner circumferential edge of the annular flange 35 and a bottom 37b closing the lower end of the side wall 37a. As shown, the outer surface side of the side wall 37a is swelling outward to some extent. On the other hand, an outer ring 39 is formed on the inner surface of the annular flange 35, and an annular small protuberance 50 is formed between the outer ring 39 and a root portion of the side wall 37a.

That is, when the cap 20 is fitted to the mouth portion 70 of the container relying on the above screw-engagement, the inner surface of an upper part of the mouth portion 70 of the container comes into close contact with the outer surface of the side wall 37a, the outer side of the upper end portion of the mouth portion 70 of the container comes in close contact with the inner surface of the outer ring 39, and the upper end surface of the mouth portion 70 of the container comes into close contact with the small protuberance 50 to maintain favorable sealing.

In the present invention, the IC tag 10 is inserted in the inside of the outer circumferential edge portion of the upper surface of the top plate 21 (i.e., in the portion on the inside of the stepped surface 40 and where the annular flange 35 and the recessed portion 37 are formed) in a manner that the IC chip 5 is on the lower side, and the circumferential edge portion of the IC tag 10 (outer circumferential end surface 6a of the second thermoplastic resin film 6) is heat-melt-adhered onto the annular stepped surface 40 on the outer circumferential edge portion of the annular flange 35. Therefore, the IC tag 10 is firmly fixed to the top plate 21, and the recessed portion 37 is covered with the IC tag 10.

That is, in the present invention, the bottom 37b of the recessed portion 37 formed in the top plate 21 works as a shielding member reliably preventing the IC tag 10 from coming into direct contact with the content (e.g., beverage) containing water in the container and, besides, maintaining a predetermined gap d between the signal transmission surface (portion where the antenna 3 is formed) of the IC tag 10 and the bottom 37b of the recessed portion 37 and, therefore, effectively preventing the transmission of signals from being interrupted by water contained in the content in the container. This makes it possible to reliably transmit signals to the IC tag 10 (IC chip 5) or to reliably receive signals from the IC tag 10 in a state where the cap 20 is fitted to the mouth portion 70 of the container and, hence, to effectively input or output the product information.

In the invention, the size of the recessed portion 37 may be such that the transmission of signals to the IC tag 10 is not interrupted by water in a state where water is in contact with the bottom 37b of the recessed portion 37. Usually, the recessed portion 37 should have a depth (above-mentioned distance d) of not smaller than 7 mm though it may differ depending, for example, upon the frequency of signals and the pattern of the antenna 3.

Figure 3:
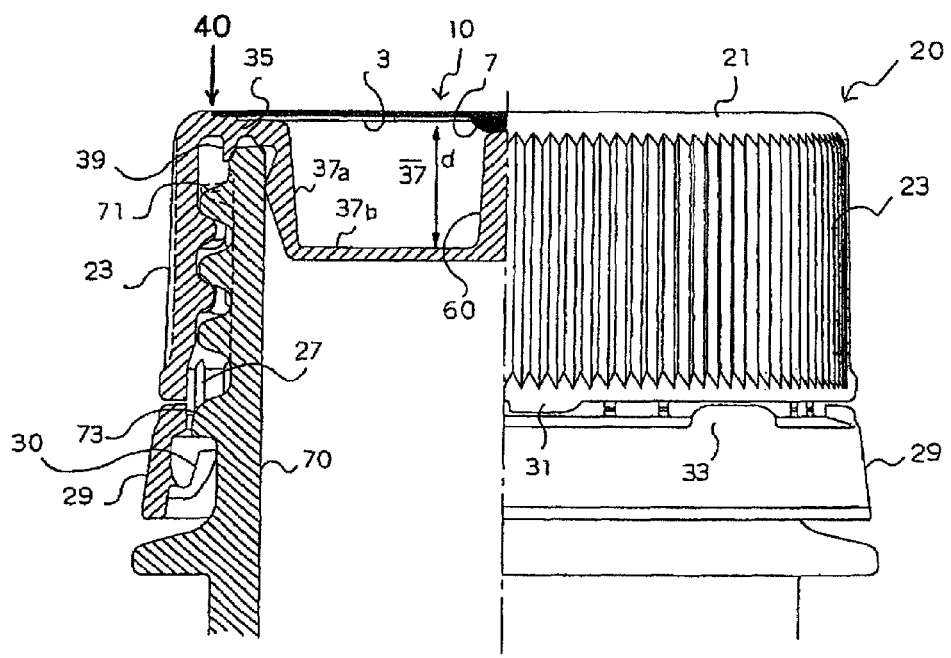
[FIG. 3] is a half-sectional side view showing another example of the plastic cap of the invention having the IC tag attached to the top plate forming the recessed portion, together with the mouth portion of the container.

In the invention as shown in FIG. 3, further, a protuberance 60 for holding the IC tag 10 may be formed on the upper surface of the bottom 37b of the recessed portion 37.

That is, as will be understood from FIG. 3, the protuberance 60 is positioned on the upper surface at the central portion of the bottom 37b, and a portion 7 of the IC tag 10 on where the IC chip 5 is provided is placed on the upper end of the protuberance 60. Upon providing the protuberance 60 to support the IC tag 10, the IC tag 10 is effectively prevented from being deformed or broken in case an external force is exerted from the upper side of the cap 20. Further, to discard the cap 20 after the use, the bottom 37b of the recessed portion 37 is pushed upward from the side of the back surface. Namely, the IC tag 10 is pushed by the protuberance 60 and can be easily removed from the top plate 21 of the cap 20 offering advantage from the standpoint of classified disposal.

The above protuberance 60 does not necessarily have to be in contact with, for example, the portion 7 on where the IC chip 5 of the IC tag 10 is provided, and a slight degree of gap maybe formed, for example, between the portion 7 and the upper end of the protuberance 60. In effect, the protuberance 60 may be so provided that the IC tag 10 is not greatly deformed when the external force is exerted from the upper direction. Therefore, the protuberance 60 is not limited to an embodiment of being provided at the central portion of the bottom 37b. For instance, a plurality of protuberances 60 may be annularly arranged symmetrically about the center of the bottom 37b in a manner that the protuberances 60 support the portion where there is provided the antenna 3 of the IC tag 10.

In the invention, it is desired that the IC tag 10 has the end surface 6a of the second thermoplastic resin film 6 attached by heat-melt-adhesion to the stepped surface 40 of the top plate 21. Depending upon the cases, further, the end surface 6a of the second thermoplastic resin film 6 may be mechanically fixed by insertion or the like to the upper surface of the annular flange 35. Further, protuberances may be provided on the outer circumferential portions of the annular flange 35, and the protuberances may be folded in a state where the IC tag 10 is placed on the upper surface of the annular flange 35 to thereby fix the circumferential edge portions of the IC tag 10. When the IC tag 10 is thus provided, the substrate 1 of the IC tag 10 does not necessarily have to be formed by using a heat-melting material such as a thermoplastic resin but may be formed by using a dielectric material such as glass or the like. The IC tag 10 can be, further, fixed to the upper surface of the annular flange 35 by insertion.

According to the above embodiment, the upper part of the mouth portion 70 of the container is inserted in space between the side wall 37a of recessed portion of the top plate 21 and the skirt wall 23 to thereby fix the cap 20 to the mouth portion 70 of the container and to maintain sealing performance relying upon the close contact between the inner surface of the mouth portion 70 of the container and the side wall 37a of the recessed portion. It is, however, also allowable to provide an inner ring as a member which is separate and independent from the side wall 37a of the recessed portion, and maintain sealing performance by using the inner ring.

Namely, with the structure in which the upper part of the mouth portion 70 of the container is inserted in space between the side wall 37a of the recessed portion and the skirt wall 23 or in which the outer surface of the side wall 37a is brought into close contact with the inner surface of the mouth portion 70 of the container to impart sealing performance, the bottom 37b that works as the shielding member is continuous to the lower end of the side wall 37a integrally therewith and, therefore, the side wall 37a has a low degree of flexibility. Therefore, the mouth portion 70 of the container may become difficult to be inserted. Further, a close contact may not be attained between the side wall 37a and the mouth portion 70 of the container, and sealing performance may lose stability. On the other hand, the inner ring that is provided quite separately from the side wall 37a of the recessed portion is not affected by the bottom 37b and maintains a high degree of flexibility, making it possible to effectively prevent the above problems.

FIG. 4 to FIG. 7 show caps provided with the above inner ring.

The caps 20 shown in FIG. 4 to FIG. 7 have basically the same structure as that of the cap 20 shown in FIG. 2 with the exception of the provision of the inner rings and, therefore, the same reference numerals are used for them, but the same members are not described here again.

Figure 4:
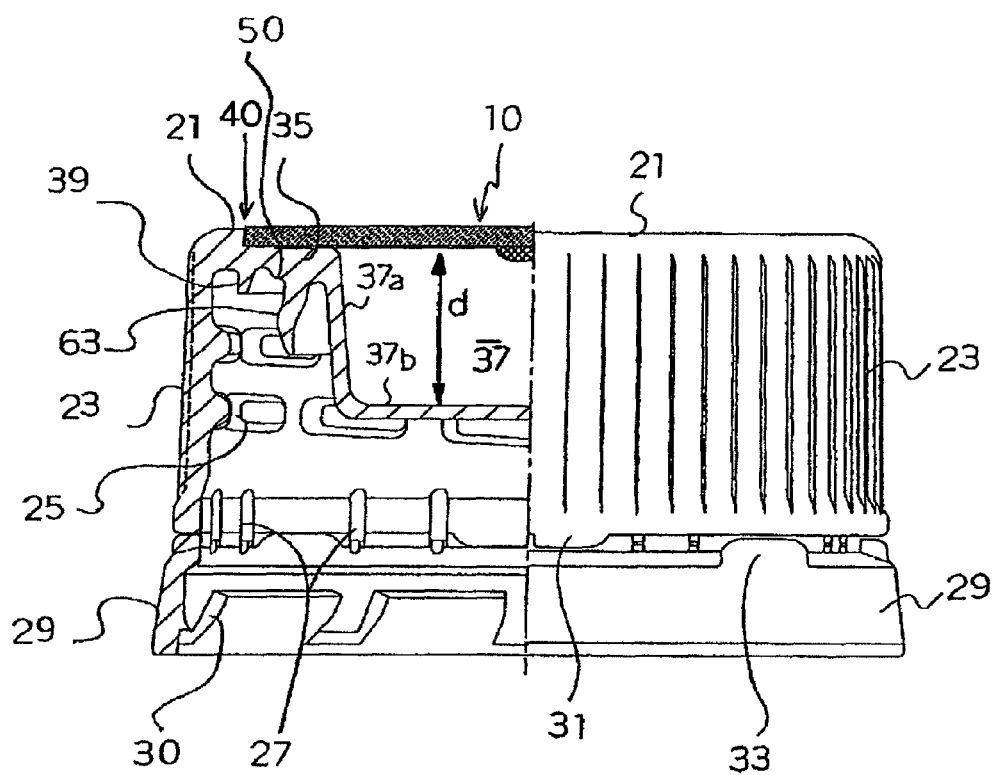
[FIG. 4] is a view showing half in cross section an embodiment of the plastic cap of the invention having the IC tag attached to the top plate forming the recessed portion, and in which an inner ring is provided separately from a side wall of the recessed portion.

Referring to FIG. 4, the cap 20 is provided with an inner ring 63 on the inner surface (lower surface) of the annular flange 35 of the top plate 21. That is, the inner ring 63 is positioned between the skirt wall 23 and the side wall 37a of the recessed portion, and extends downward maintaining a gap relative to the skirt wall 23 and so will not to come in contact with the outer surface of the side wall 37a of the recessed portion. Further, the inner ring 63 has an outer surface that is swelling outward at the central portion thereof, and comes into favorable and close contact with the inner surface of the mouth portion 70 of the container.

As will be understood from FIG. 4, the upper part of the mouth portion 70 of the container is inserted in space between the inner ring 63 and the skirt wall 23, whereby the outer surface of the inner ring 63 comes into close contact with the inner surface of the mouth portion 70 of the container to maintain favorable sealing performance. That is, unlike the side wall 37a of the recessed portion, the lower end of the inner ring 63 is not locked and, therefore, exhibits a high degree of flexibility. As a result, the mouth portion 70 of the container can be easily and smoothly inserted and, besides, the outer surface of the inner ring 63 comes into reliable and close contact with the inner surface of the mouth portion 70 of the container making it possible to stably maintain excellent sealing performance.

Figure 5:
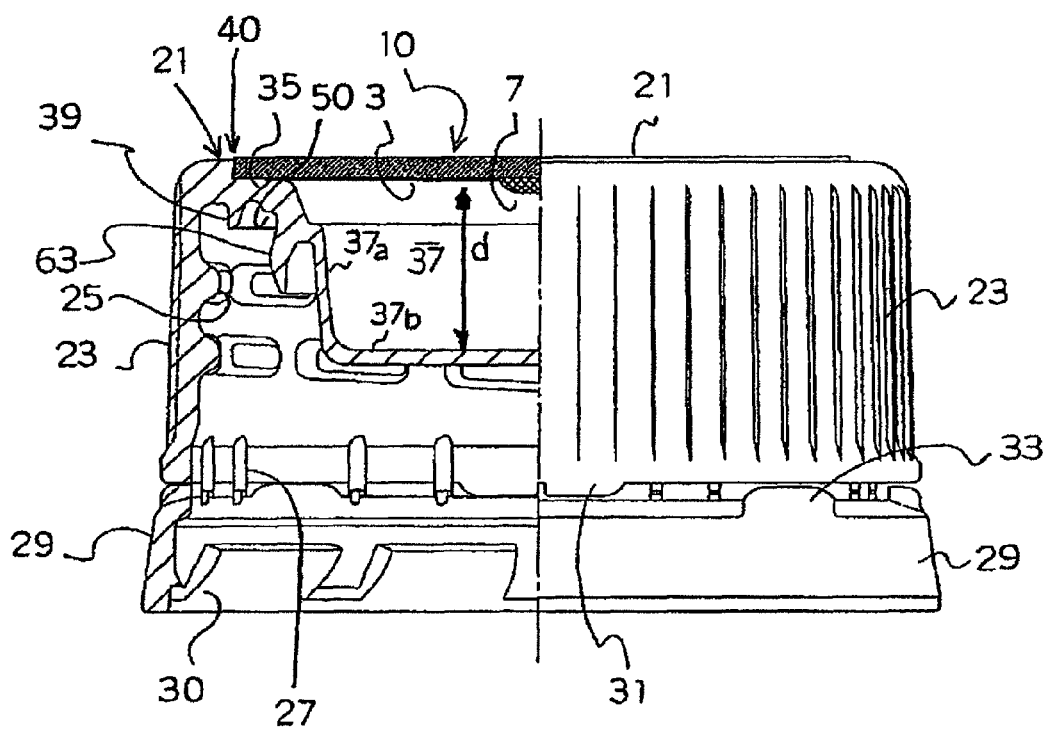
[FIG. 5] is a half-sectional side view showing a preferred example of the plastic cap of the invention having the inner ring formed in a manner different from that of FIG. 4.

In the above embodiment, the inner ring 63 was provided on the inner surface of the annular flange 35. Referring to FIG. 5 which is a half-sectional side view, FIG. 6 which is a half-sectional side view thereof together with the mouth portion of the container and FIG. 7 which is an enlarged view showing a major portion, the cap 20 is provided with an inner ring 63 at an intermediate portion of the side wall 37a of the recessed portion.

Figure 6:
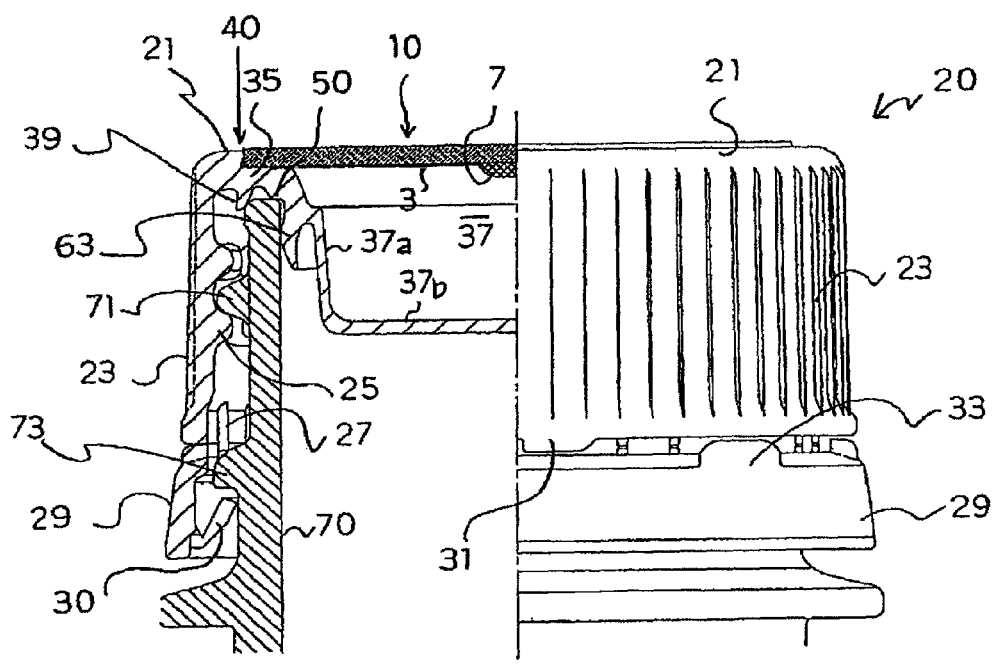
[FIG. 6] is a view showing half in cross section the side surface of the plastic cap of FIG. 5 together with the mouth portion of the container.
Figure 7:
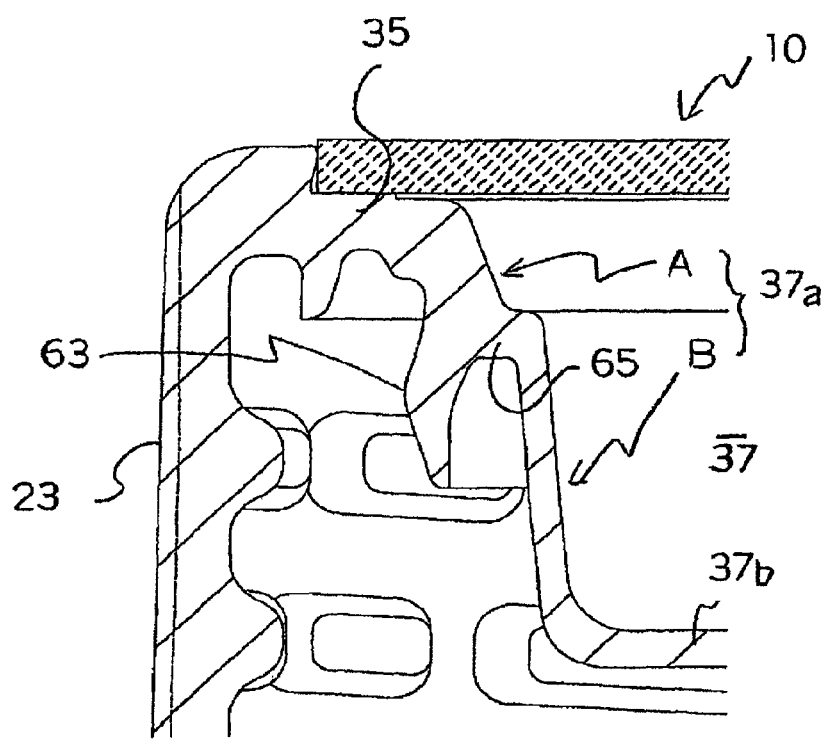
[FIG. 7] is a partially enlarged view showing, on an enlarged scale, the inner ring which is a major portion of the plastic cap of FIG. 5.

That is, in the cap shown in FIG. 5 to FIG. 7, a horizontal step 65 is provided at the intermediate portion of side wall 37a of recessed portion of the top plate 21, and the side wall 37a includes an upper large-diameter portion A positioned on the upper side and having a relatively large outer diameter and a lower small-diameter portion B positioned on the lower side and having a relatively small outer diameter (see FIG. 7). The inner ring 63 is formed on the outer circumferential surface of the upper large-diameter portion A, and is extending downward so will not to come in contact with the lower small-diameter portion B.

In the cap 20 provided with the above inner ring 63, too, like in the cap of FIG. 4, the upper part of the mouth portion 70 of the container is inserted in space between the inner ring 63 and the skirt wall 23, and the lower end of the inner ring 63 (portion lower than the outwardly swollen portion) is not locked, featuring a high degree of flexibility. Therefore, the mouth portion 70 of the container can be easily and smoothly inserted enabling the outer surface of the inner ring 63 to come into reliable and close contact with the inner surface of the mouth portion 70 of the container and, therefore, maintaining excellent and stable sealing performance.

In the embodiment of FIG. 5 to FIG. 7, further, the horizontal step 65 is provided in the intermediate portion of side wall 37a of the recessed portion to divide the side wall 37a into the upper large-diameter portion A and the lower small-diameter portion B. The horizontal step 65, however, does not necessarily have to be provided if the inner ring 63 is not locked upon coming in contact with the outer surface of the side wall 37a. The horizontal step 65 does not have to be formed if, for example, the side wall 37a of the recessed portion is so formed that its upper portion has a large diameter and its lower portion has a small diameter and if the inner ring 63 so extends downward as will not to come in contact with the lower small-diameter portion.

Among the caps of the embodiments provided with the inner ring 63 as described above, the cap 20 of the embodiment shown in FIG. 5 to FIG. 7 is most desired. That is, in the embodiment of FIG. 5 to FIG. 7, the inner ring 63 is extending from the intermediate portion of side wall 37a of the recessed portion. Therefore, even if the water-containing content in the container may infiltrate into space between the inner ring 63 and the side wall 37a of the recessed portion, a predetermined gap is maintained between the content in the container and the circumferential edge portion of the IC tag 10 attached to the upper surface of the annular flange 35 covering the recessed portion 37. Therefore, the transmission of signals is more reliably prevented from being interrupted by the content in the container.

In the above-mentioned embodiment, further, the recessed portion 37 is formed in the top plate 21, the bottom 37b of the recessed portion 37 works as the shielding member, and the predetermined clearance d is maintained between the IC tag 10 attached to the top plate 21 and the water-containing content in the container. Here, in the present invention, the above-mentioned clearance d may also be maintained by attaching a shielding member to the top plate 21.

Figure 8:
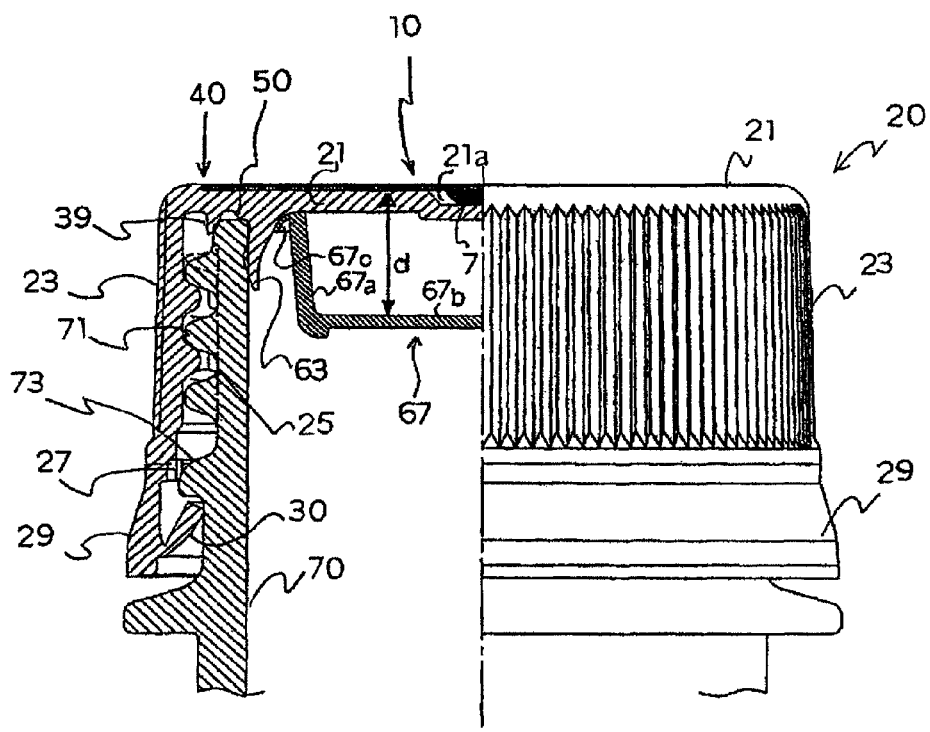
[FIG. 8] is a half-sectional side view showing an example of the cap of the invention in which a shielding member is attached to the top plate together with the mouth portion of the container.

For example, a cap of FIG. 8 is forming no recessed portion 37 that has a bottom 37b to work as the shielding member. Therefore, the top plate 21 is substantially flat. At its central portion, however, there is formed a small recessed portion 21a for receiving a portion 7 on which the IC chip 5 of the IC tag 10 is provided. An upright annular stepped surface 40 is formed in the circumferential edge portion of the top plate 21 like in the cap of FIG. 1 to FIG. 7, and the IC tag 10 is fitted onto the top plate 21 with the side on where the IC chip 5 is provided as the lower side, and is fixed by heat-melt-adhering the end surface 6a of the second thermoplastic resin film 6 onto the annular stepped surface 40.

Stopper pieces 31, 33 are omitted in the cap 20 shown in FIG. 8.

In FIG. 8, an inner ring 63 is provided on the lower surface of the top plate 21 so as to extend downward maintaining a gap relative to the skirt wall 23 and swelling on the outer surface side thereof. When the cap 20 is fitted to the mouth portion 70 of the container by screw-engagement as described above, the upper part of the mouth portion 70 of the container is inserted in space between the inner ring 63 and the skirt wall 23, whereby the inner surface of the mouth portion 70 of the container comes into close contact with the outer surface of the inner ring 63 to maintain favorable sealing performance.

In the cap 20 of this embodiment, a shielding member 67 is attached to the lower surface of the top plate 21 at a portion surrounded by the inner ring 63. The shielding member 67 has the same shape as the above recessed portion 37, and includes an annular side wall 67a and a bottom wall portion 67b. The bottom wall portion 67b maintains a gap d between the antenna 3 of the IC tag 10 and the liquid level of the content in the container to a degree large enough for preventing the transmission and reception of signals from being interrupted. It is, therefore, made possible to reliably transmit (input) product information to the IC tag and receive (output) product information that is input without interrupting the transmission of signals (electromagnetic waves) due to dielectric loss and mismatching of impedance caused by water contained in the content in the container.

The shielding member 67 is made from the same resin (e.g., polyolefin resin) as the cap member. A thin flange portion 67c extends outward from the upper end of the annular side wall 67a and is firmly fixed by heat-melt adhesion to the inner side of the inner ring 63 on the lower surface of the top plate 21, preventing the content in the container from leaking into the interior of the shielding member 67 and, further, preventing the sterilizing water used at the time of aseptic filling from entering into the lower surface side of the top plate 21. Thus, the transmission of signals is reliably prevented from being interrupted by water. The shielding member 67 can be inserted in the inner surface side at the root portion of the inner ring 63 without effecting the heat-melt adhesion. In this case, however, the shielding member 67 loses stability, and the effect for shutting off water becomes insufficient. When the aseptic filling is conducted, therefore, the sterilizing water may infiltrate, and the transmission and reception of signals to and from the IC tag 10 lose stability. It is, therefore, desired that the shielding member 67 is provided by heat-melt adhesion.

As shown in FIG. 8, further, it is desired that the shielding member 67 is of a shape that can be heat-melt-adhered near the root portion of the inner ring 63 so as to shut off a majority proportion of the antenna 3 formed on the IC tag 10 from the content in the container. Further, the shielding member 67 can be heat-melt-adhered to the lower end of the inner ring 63. In this case, however, it becomes difficult to attain press-adhesion at the time of heat-melt adhesion. As shown in FIG. 8, therefore, it is desired that the shielding member 67 is heat-melt-adhered near the root portion of the inner ring 63

Thus, by using the shielding member 67 as a member separate from the top plate 21 and by attaching it to the lower surface of the top plate 21, it is allowed to maintain a predetermined gap d between the IC tag 10 and the content containing water in the container. This embodiment, however, requires a step of heat-melt-adhering the shielding member 67 in the step of forming a cap decreasing the productivity. As shown in the embodiments of FIG. 2 to FIG. 7, therefore, a predetermined gap d is desirably maintained by forming the recessed portion 37 in the top plate 21.

<Attaching the IC Tag>

According to the present invention, the cap 20 is molded by injection-molding various kinds of plastics followed by compression molding. Thereafter, the IC tag 10 is attached by means described below.

Figure 9:
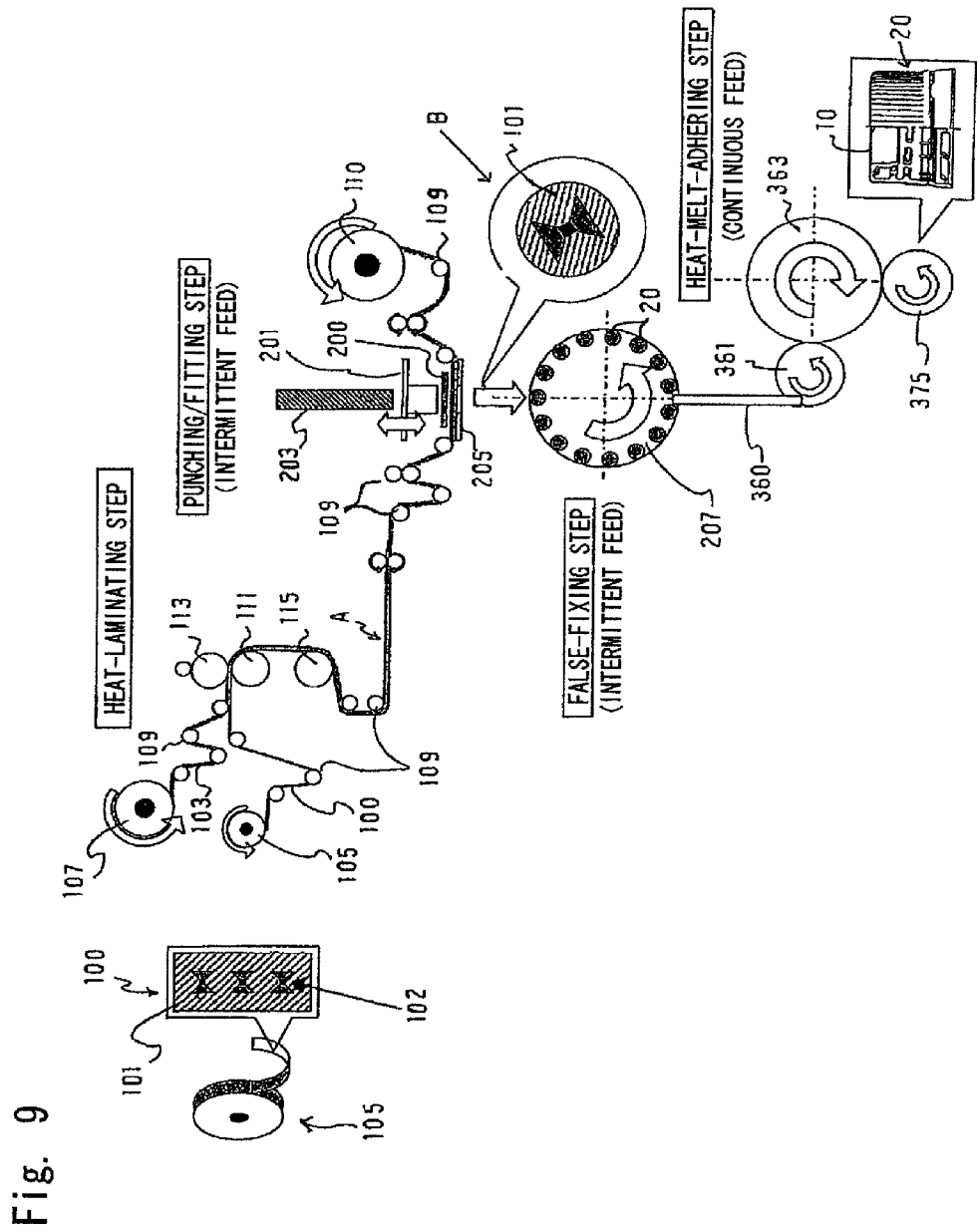
[FIG. 9] is a view schematically showing a process until the IC tag is attached to the cap.

Referring to FIG. 9 illustrating the steps of the method of attaching IC tags of the invention, there are, first, provided an IC tag web 100 and a thermoplastic resin substrate sheet 103 for heat sealing.

The IC tag web 100 has a plurality of IC units 102 of a combination of the IC chip 5 and the metallic antenna 3 arranged and fixed on one surface of a substrate 101 comprising the first thermoplastic resin (hereinafter simply referred to as first substrate sheet), the first substrate sheet 101 corresponding to the above-mentioned first thermoplastic resin film 1. That is, the IC tags 10 to be attached to the caps 20 are, usually, placed in the market in the form of the IC tag web 100 wound into a roll 105. The IC unit 102 is punched from the IC tag 23b 100 and is fixed as the IC tag 10 onto the cap 20.

Further, a thermoplastic resin substrate sheet for heat sealing (hereinafter simply referred to as second substrate sheet) 103 corresponds to the second thermoplastic resin film 6 mentioned above. The second substrate sheet 103 has the same width as the width of the IC tag web 100 (width of the first substrate sheet 101).

In the invention, the second substrate sheet 103 is wound into a roll 107. The second substrate sheet 103 wound into the roll 107 is fed, taken up by a take-up roll 110 via a plurality of guide rolls 109, and on the way thereof are arranged the heat-laminating step and the punching/fitting step.

In the heat-laminating step, the first substrate sheet 100 and the second substrate sheet 103 are heat-adhered together to laminate the IC tag web 100 on the surface of the second substrate sheet 103 to thereby form a laminated sheet A.

That is, in this step, a heating roller 111 and a pressing roller 113 are arranged facing each other for attaining heat adhesion. The IC tag web 100 is delivered from the roller 105. The delivered web 100 is overlapped on the second substrate sheet 103 via a plurality of guide rollers 109, which, in this state, are passed through between the heating roller 111 and the pressing roller 113 where they are heated by the heating roller 111 while being pressed by the pressing roller 113. Thus, the first substrate sheet 101 (first thermoplastic resin substrate) and the second substrate sheet (second thermoplastic resin substrate) 103 are heat-adhered together to form a laminate A having the web 100 laminated on the surface of the second substrate sheet 103. The laminate A is intermittently taken up by the take-up roller 110 via a plurality of guide rollers 109 (i.e., the second substrate sheet 103 is taken up in the form of the laminate A), and is introduced into the punching/fitting step that will be described later.

In conducting the heat adhesion, the IC tag web 100 is overlapped on the second substrate sheet 103 maintaining such a positional relationship that the IC units 102 are on the lower side and that the back surface of the first substrate sheet 101 faces the second substrate sheet 103. Therefore, the laminated sheet A obtained through this step has the IC units 102 that are exposed on the lower surface. Further, the heat adhesion is effected under such a condition that the heating roller 111 and the pressing roller 113 are heated by the heating roller 111 at a temperature which is not lower than the melting point of the second substrate sheet 103 (second thermoplastic resin).

Figure 10:
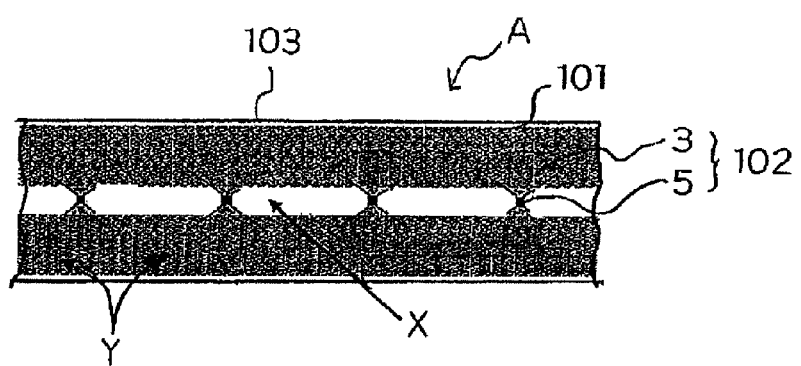
[FIG. 10] is a plan view illustrating a state of heat-adhering a laminated sheet formed in the step of heat-laminating the IC tag of FIG. 9.

In the above heat-laminating step, it is desired to effect the heat adhesion without pressing a portion where the IC chip 5 is formed in the IC unit 102 on the IC tag web 100. Concretely, a groove is formed in the heating roller 111, and the heat adhesion is conducted by passing the IC chips 5 through the groove. As shown in FIG. 10, the thus obtained laminate A is not pressed at the central white spot portions X where the IC chips 5 are provided; i.e., these portions are becoming non-melt-adhered portions or weakly melt-adhered portions, and hatched portions Y on both sides thereof are becoming melt-adhered portions. By conducting the heat adhesion as described above, breakage of the IC chips 5 due to the pressing can be reliably avoided.

Reverting to FIG. 9, the laminate A of the IC tag web 100 and the second substrate sheet 103 formed as described above, is intermittently taken up by the take-up roll 110, and is intermittently conveyed to the punching/fitting step via a cooling roller 115 and a plurality of guide rolls 109.

In the punching/fitting step, a hollow guide 200 is positioned and fixed over the laminated sheet A, and a hollow punch 201 for punching is arranged over them so as to move up and down. Further, a pushing punch 203 is arranged so as to move up and down passing through the inside of the hollow punch 201.

Further, a hollow die set 205 is positioned and fixed on the lower side of the laminated sheet A, and a support table 207 that intermittently rotates is arranged on the lower side thereof. The caps 20 having the above-mentioned structure are held on the support table 207 by suction or the like, and are fed to a predetermined position on the lower side of the die set 205 in synchronism with the laminated sheet A that is intermittently fed.

Figure 11:
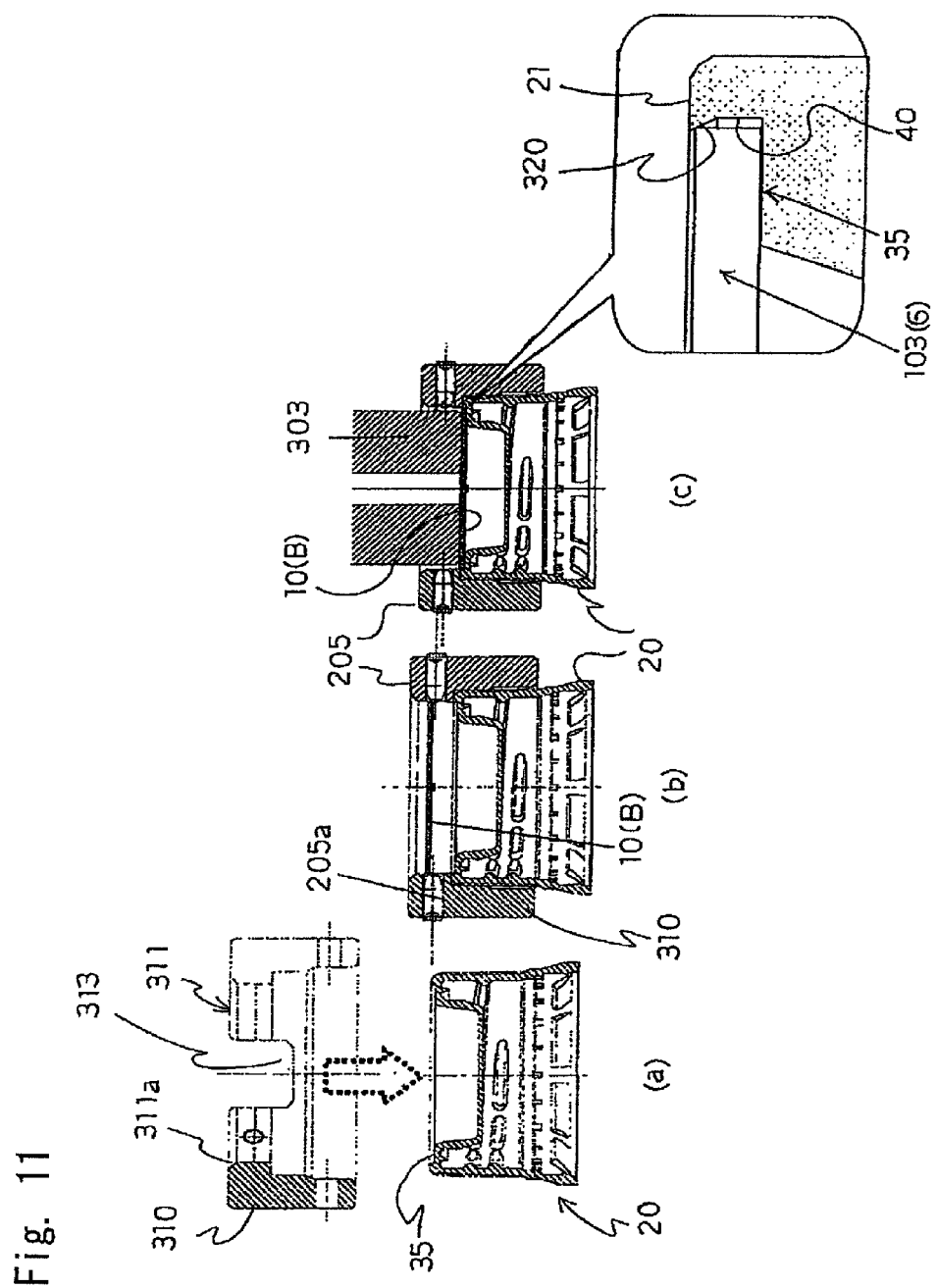
[FIG. 11] is a view showing a step of fitting the IC tag of FIG. 9 onto the cap.

Referring to FIG. 9 as well as FIG. 11 which illustrates the punching/fitting step, the cap 20 is covered with an adaptor 310 (see FIG. 11(a)) prior to being introduced into the above step.

The adaptor 310 is for fitting a tag piece B punched from the laminated sheet onto the upper surface of top plate of the cap 20 without positional deviation, has an opening 311 permitting the upper surface of top plate of the cap 20 to be exposed, and has a tapered surface 311a formed at an upper end portion thereof being tilted downward and inward. The adaptor 310, further, has a notch 313 for conducting the false fixing by spot melt adhesion that will be described later.

That is, the cap 20 covered with the adaptor 310 stops on the lower side of the die set 205. In this state, the hollow punch 201 moves down passing through the opening of the guide 200 to punch the tag piece B in a disk shape from the laminated sheet A. As shown in FIG. 9, the tag piece B that is punched is of the structure in which the second substrate 103 corresponding to the second thermoplastic resin substrate film 6 is adhered to the IC tag 10 of FIG. 1, and has a diameter substantially the same as the diameter of the stepped surface 40 of the cap 20.

The punched tag piece B is temporarily held on the upper side of the adaptor 310 by a pawl 205a provided on the lower side of the die set 205 (see FIG. 11 (b)).

Next, in this state, the pushing punch 203 moves down passing through the opening of the die set 205 to push and fit the punched tag piece B (IC tag 10) to the top plate (inside of the stepped surface 40) of the cap 20 (see FIG. 11 (c)). Thus, the tag piece B having the IC tag 10 is fitted so that the IC unit 102 provided in the tag piece B faces the cap side, that the second substrate sheet 103 is on the outer surface side, and that the circumferential edge portion of the second substrate 103 faces the annular flange 35 of top plate of the cap. That is, due to the tapered surface 311a formed in the adaptor 310, the punched tag piece B (IC tag 10) is smoothly fitted to the above position without deviated in position.

After the tag piece B is punched from the laminated sheet A and is fitted as described above, the pushing punch 203 and the hollow punch 201 move up, the laminated sheet A from which the tag piece B with IC tag 10 is punched is taken up by the take-up roll 110, and the cap 20 to which the tag piece B is fitted is intermittently fed in a state of being covered with the adaptor 310 to the next false-fixing step due to the intermittent turn of the support table 207.

According to the present invention as described above, the tag piece B to which the IC tag 10 is fixed is punched from the laminated sheet A and is fitted to the cap 20 simultaneously without passing through the step of conveyance. Besides, the IC tags 10 which are small and light in weight are not handled by themselves but are handled in the form of a long sheet from the above-mentioned heat-laminating step up to the punching/fitting step reliably preventing the IC tags 10 from flying off.

In the above punching/fitting step, the tag piece B is fitted to the upper surface of top plate 21 of the cap 20, i.e., fitted to the inside of the annular stepped surface 40 and, therefore, is in a false-fixed state. However, the above false-fixing only may not often be sufficient. In such a case, as shown in FIG. 11(c), an inwardly protruded undercut 320 may be formed at an upper end (upper end of the stepped surface 40) on the inside of the circumferential edge of top plate 21 of the cap 20. When the above undercut 320 is formed, the tag piece B that is fitted is firmly fixed upon being engaged with the undercut 320.

According to the present invention as described above, the tag piece B can be fitted and false-fixed simultaneously through the punching/fitting step. Desirably, however, the false-fixing step is provided after the punching/fitting step.

Referring to FIG. 9, the cap 20 to which the tag piece B is fitted is introduced into the false-fixing step due to the intermittent turn of the support table 207, and the tag piece B (IC tag 10) is false-fixed by spot-melt adhesion.

Figure 12:
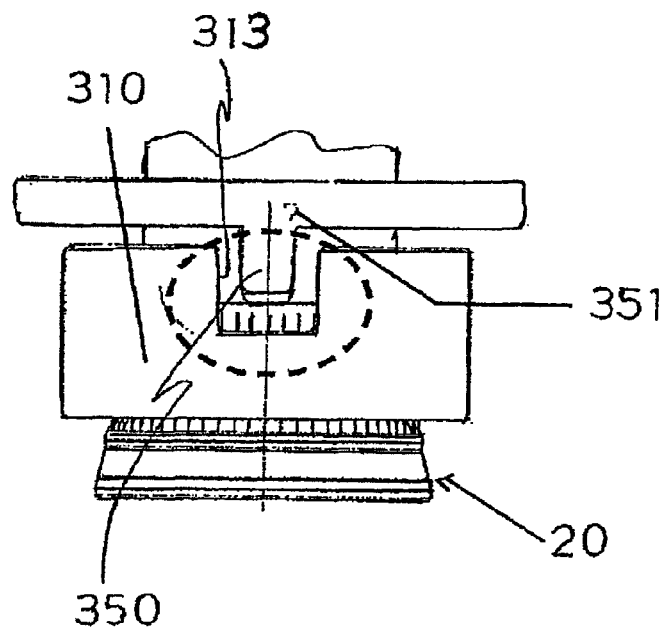
[FIG. 12] is a view illustrating a step of false-fixing the IC tag of FIG. 9 onto the cap.

Reference is made to FIG. 12 explaining the false-fixing step. In the false-fixing step provided separately from the punching/fitting step, a sealing rod 351 having a slender rod-like false-melt-adhering head 350 at an end thereof moves down from over the cap 20 that is supported on the support table 207 and is covered with the adaptor 310. The false-melt-adhering head 350 passes through the notch 313 formed in the adaptor 310 to come into pressed contact with the circumferential edge portion of the tag piece B (i.e., circumferential edge portion of the second substrate 103 of IC tag 10) that is facing the annular flange 35 of top plate 21 of the cap to heat the above portion. Therefore, the second substrate 103 is heat-melt-adhered to the top plate 21 (annular flange 35) of the cap as a spot, and the tag piece B or the IC tag 10 is false-fixed. The spot-melt adhesion can be attained in a very short period of time (about 0.1 second) as compared to the whole-melt adhesion. Besides, the above false-fixing helps effectively avoid such an inconvenience that the tag piece B is removed away from the cap 20 before the tag piece B (IC tag 10) is completely fixed in the subsequent heat-melt-adhering step.

After the above false-fixing, the adaptor 310 moves up so as to be removed from the cap 20 and is put again onto a cap of before the punching/fitting step. Further, the cap 20 to which the tag piece B (IC tag 10) is false-fixed is intermittently fed by the intermittent turn of the support table 207, transferred from the support table 207 onto a conveyer belt 360 that is continuously driven, transmitted from the conveyer belt 360 onto a continuously turning table 363 via an intermediate table 361, and the tag piece B (IC tag 10) is finally fixed in the final heat-melt-adhering step while being continuously fed by the table 363.

Figure 13:
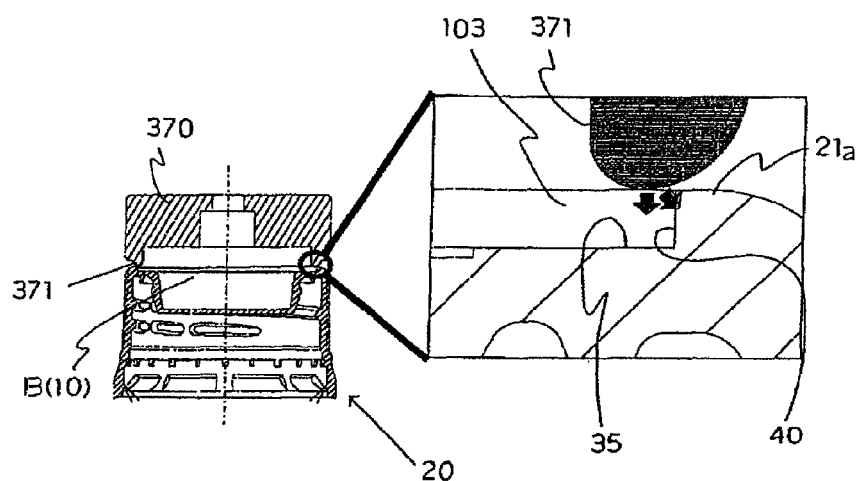
[FIG. 13] is a view illustrating a step of heat-melt-adhesion in FIG. 9.

Reference is now made to FIG. 9 together with FIG. 13 which explains the heat-melt-adhering step. In this step, a heat-sealing member 370 moves in synchronism with the continuously turning table 363, and is arranged along the direction in which the continuously turning table 363 turns.

The heat-sealing member 370 has, at its lower end, a sealing head 371 of a shape corresponding to the circumferential edge portion of the second substrate 103 that is adhered and fixed to the tag piece B (IC tag 10). The heat-sealing member 370 moves down and comes into pressed contact with the circumferential edge portion of the second substrate sheet 103 of tag piece B false-fixed to the cap 20. In this state, the heat-sealing member 370 moves together with the cap 20 and is heat-melt-adhered by the sealing head 371; i.e., the outer circumferential end surface of the second substrate 103 of tag piece B (end surface 6a of the film 6) that is false-fixed is pushed onto the annular stepped surface 40 and is heat-melt-adhered thereto so as to be completely fixed. The sealing time in this case is about one second.

After the heat-melt adhesion is finally conducted as described above, the heat-sealing member 370 moves up so as to be removed from the cap 20, and is melt-adhered again onto the next cap 20. Further, the cap 20 to which the tag piece B (IC tag 10) is completely fixed is transferred onto a discharge table 375 that is continuously turning, continuously discharged from the table 375, and is collected as a final product.

Thus, there is obtained the cap with IC tag having the IC tag 10 shown in FIG. 1 that is fixed to the upper surface of top plate 21 of the cap.

In the foregoing was described the method of attaching the IC tag 10 with reference to the case of the cap 20 of FIG. 2 having the recessed portion 37 formed in the top plate 21. It will, however, be obvious that the IC tag 10 can be similarly attached to the cap without forming the recessed portion 37 as well.

In the example of FIG. 9, further, while the second substrate sheet 103 is being intermittently taken up by the take-up roller 110, provision is made of the heat-laminating step and the punching/fitting step to effect the heat-lamination and punching/fitting. Here, after heat-laminated, the laminate A may be once taken up and may be conveyed to another place to effect the punching and fitting. In this case, since the heat-laminating step and the punching/fitting step are conducted completely independently from each other, there is obtained an advantage in that the IC tag web 100 and the second substrate sheet 103 are continuously conveyed and are continuously heat-laminated.

According to the method of attaching IC tags of the invention described above, the IC tags which are very light in weight and difficult to handle can be efficiently attached to the top plates of the caps maintaining high productivity without accompanied by such inconveniences as flying off and deviation in position.

In attaching the IC tags 10, further, it is also allowable, for example, to punch the IC units 102 from the IC tag web 100, heat-laminate them on the second substrate sheet 103 to form the laminate, convey the laminate to the punching/fitting step, and fit the IC tags 10 to the caps 20 while punching the IC units 102 from the laminate. With this means, however, the IC units 102 must be punched twice requiring a very complex control operation for intermittently feeding the IC tag web 100. According to the present invention, however, the IC units 102 are punched only once in the punching/fitting step requiring an easy control operation for intermittent feeding and featuring a very high productivity.

The invention claimed is:

1. A method of attaching an IC tag to a plastic cap, comprising:
    preparing an IC tag web in which a plurality of IC units of a combination of IC chips and metal antennas are arranged and fixed on one surface of a first thermoplastic resin substrate sheet, a second thermoplastic resin substrate sheet, and a plastic cap having a top plate and a skirt wall hanging down from a circumferential edge portion of the top plate;
    preparing a laminated sheet in which said IC tag web is laminated on a surface of the second thermoplastic resin substrate sheet by heat-adhering the first thermoplastic resin substrate sheet of said IC tag web and the second thermoplastic resin substrate sheet together in a manner that said IC units are positioned on an outer surface side;
    punching said laminated sheet in a disk shape successively for each of the IC units fixed thereto to thereby successively form tag pieces of the disk shape having the second thermoplastic resin substrate adhered to the IC tag in which one IC unit is fixed to the first thermoplastic resin substrate, and successively fitting and false-fixing the punched tag pieces onto the upper surfaces of the top plates of the caps in a manner that the second thermoplastic resin substrate is on the outer surface side simultaneously with the punching; and
    fixing said IC tag onto the top plate of the cap via the second thermoplastic resin substrate in an integral form by heat-melt-adhering the second thermoplastic resin substrate onto the upper surface of the top plate of the cap.

2. The method according to claim 1, wherein the first thermoplastic resin substrate sheet comprises polyethylene terephthalate and the second thermoplastic resin substrate sheet comprises polyolefin.

3. The method according to claim 1, wherein a stepped surface is formed in an annular shape at the outer circumferential edge portion on the upper surface of the top plate of said cap, the inner region of said stepped surface forms a surface lower than the outer region, and the tag piece punched from the laminated sheet is fitted onto the inner region of said stepped surface.

4. The method according to claim 3, wherein the tag piece punched from the laminated sheet is inserted into an inner portion of said stepped surface in a manner that the outer circumferential end surface of the second thermoplastic resin substrate is closely adhered to said stepped surface, and is, thus, fitted onto, or is fitted and false-fixed onto the upper surface of the top plate of the cap.

5. The method according to claim 3, wherein an undercut is formed in an upper end portion of said stepped surface so as to protrude inward, and the tag piece is false-fixed by an engagement of said undercut with an outer circumferential edge portion of the second thermoplastic resin substrate.

6. The method according to claim 3, wherein the inner region of the stepped surface on the upper surface of the top plate of said cap includes an annular flange continuous to the lower end of said stepped surface and is extending inward, and a recessed portion continuous to the inner circumferential edge of said annular flange, and said tag piece is so fitted that the circumferential edge portion thereof faces said annular flange.

7. The method according to claim 1, wherein the first thermoplastic resin substrate sheet and the second thermoplastic resin substrate sheet are heat-adhered together in a manner that at least the IC chip is not pressed on the surface of the first thermoplastic resin substrate sheet.

8. The method according to claim 1, wherein said IC tag web is laminated while intermittently feeding said second thermoplastic resin substrate sheet, the laminated sheet is punched after having been laminated, and the punched tag pieces are fitted onto the top plates of the caps.

9. The method according to claim 1, wherein the second thermoplastic resin substrates possessed by said IC tag pieces are spot-heat-adhered onto the upper surfaces of the top plates of the caps so that the tag pieces are false-fixed while intermittently feeding the caps having the tag pieces fitted onto the upper surfaces of the top plates thereof.

10. The method according to claim 1, wherein the caps to which the tag pieces are false-fixed are introduced into the step of continuous feeding, and the second thermoplastic resin substrates possessed by the tag pieces are heat-melt-adhered onto the upper surfaces of the top plates of the caps while continuously feeding said caps so that said IC tags are fixed to the top plates of said caps integrally therewith.

\* \* \* \* \*